(12) United States Patent
Pinarbasi

(10) Patent No.: US 7,382,587 B2
(45) Date of Patent: Jun. 3, 2008

(54) MAGNETIC HEAD HAVING SELF-PINNED SV STRUCTURES FOR CPP GMR APPLICATIONS

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 502 days.

(21) Appl. No.: 10/837,543

(22) Filed: Apr. 30, 2004

(65) Prior Publication Data

US 2005/0243478 A1 Nov. 3, 2005

(51) Int. Cl.
*G11B 5/39* (2006.01)
*G11B 5/127* (2006.01)

(52) U.S. Cl. ............................... 360/324.11; 360/324.2

(58) Field of Classification Search ............. 360/324.1, 360/324.11, 324.12, 324.2
See application file for complete search history.

(56) References Cited

U.S. PATENT DOCUMENTS

| | | | | |
|---|---|---|---|---|
| 5,583,725 A * | 12/1996 | Coffey et al. | .......... | 360/324.11 |
| 5,731,936 A * | 3/1998 | Lee et al. | .............. | 360/327.22 |
| 6,046,892 A * | 4/2000 | Aoshima et al. | ....... | 360/324.11 |
| 6,258,468 B1 * | 7/2001 | Mahvan et al. | ............. | 428/679 |
| 6,278,592 B1 * | 8/2001 | Xue et al. | ............... | 360/324.12 |
| 6,519,120 B1 * | 2/2003 | Lee et al. | ................. | 360/324.1 |
| 7,019,949 B2 * | 3/2006 | Freitag et al. | ......... | 360/324.11 |
| 7,092,219 B2 * | 8/2006 | Pinarbasi | .................. | 360/324.1 |
| 7,180,715 B2 * | 2/2007 | Gill | ........................ | 360/324.11 |
| 7,203,038 B2 * | 4/2007 | Pinarbasi | ............... | 360/324.11 |
| 2001/0033465 A1 * | 10/2001 | Noma et al. | ........... | 360/324.12 |
| 2002/0024780 A1 * | 2/2002 | Mao et al. | ............. | 360/324.11 |
| 2003/0179500 A1 * | 9/2003 | Gill et al. | .................... | 360/240 |
| 2004/0075959 A1 * | 4/2004 | Gill | ........................ | 360/324.12 |
| 2004/0165321 A1 * | 8/2004 | Hasegawa et al. | ..... | 360/324.11 |
| 2004/0228044 A1 * | 11/2004 | Hasegawa et al. | ....... | 360/324.1 |
| 2005/0002129 A1 * | 1/2005 | Gill | ........................ | 360/324.11 |
| 2005/0002131 A1 * | 1/2005 | Gill | ........................ | 360/324.12 |
| 2005/0002132 A1 * | 1/2005 | Gill | ........................ | 360/324.12 |
| 2005/0013061 A1 * | 1/2005 | Gill | ........................ | 360/324.11 |
| 2005/0013062 A1 * | 1/2005 | Gill | ........................ | 360/324.12 |
| 2005/0018362 A1 * | 1/2005 | Gill | ........................ | 360/324.1 |
| 2005/0018364 A1 * | 1/2005 | Gill | ........................ | 360/324.11 |
| 2005/0018365 A1 * | 1/2005 | Gill | ........................ | 360/324.11 |
| 2005/0068684 A1 * | 3/2005 | Gill | ............................ | 360/314 |
| 2005/0068693 A1 * | 3/2005 | Freitag et al. | ......... | 360/324.11 |
| 2005/0122635 A1 * | 6/2005 | Freitag et al. | ......... | 360/324.11 |
| 2005/0128652 A1 * | 6/2005 | Freitag et al. | ......... | 360/324.11 |
| 2005/0190508 A1 * | 9/2005 | Gill | ........................ | 360/324.1 |
| 2005/0190509 A1 * | 9/2005 | Fox et al. | ................. | 360/324.1 |
| 2005/0213258 A1 * | 9/2005 | Gill | ............................ | 360/314 |
| 2005/0231853 A1 * | 10/2005 | Li et al. | ................... | 360/324.1 |
| 2005/0237676 A1 * | 10/2005 | Gill | ........................ | 360/324.11 |
| 2007/0139828 A1 * | 6/2007 | Pinarbasi | ............... | 360/324.11 |

FOREIGN PATENT DOCUMENTS

EP 687917 A2 * 12/1995
JP 2002230717 A * 8/2002

* cited by examiner

*Primary Examiner*—William J Klimowicz
(74) *Attorney, Agent, or Firm*—Patent Law Office of Larry Guernsey; Larry Guernsey

(57) ABSTRACT

A magnetic head is disclosed having a CPP read sensor including a seed layer of NiFeCr, a self-pinned structure, a spacer layer, at least one free layer, and an upper capping layer. A lower capping layer of conductive material is also preferred. An alternate embodiment includes a read sensor having an in-stack biasing structure.

27 Claims, 5 Drawing Sheets

MAGNETIC HEAD HAVING SELF-PINNED SV STRUCTURES FOR CPP GMR APPLICATIONS

BACKGROUND OF THE INVENTION

1. Field of the Invention

The present invention relates generally to magnetoresistive sensors for magnetic read heads for magnetic data storage mediums, and more particularly to a magnetoresistive sensor using pinned layers which are self-pinned due to magnetostrictive anisotropy effects.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" onto which the read/write sensors of the magnetic head are fabricated. The slider flies above the surface of the disks on a thin cushion of air, and the surface of the slider which faces the disks is called an Air Bearing Surface (ABS).

The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads has become progressively smaller. This decrease in track width has allowed for dramatic increases in the areal density data storage density of disks.

Recent read heads typically use a tunnel junction sensor, also known as a "tunnel valve", abbreviated "TV", for reading the magnetic field signals from the rotating magnetic data storage disk. The TV sensor typically includes a non-magnetic tunneling barrier layer sandwiched between a ferromagnetic pinned layer and a ferromagnetic free layer. The pinned layer in turn is fabricated on an antiferromagnetic (AFM) pinning layer which fixes the magnetic moment of the pinned layer at an angle of 90 degrees to the air bearing surface (ABS). The tunnel junction sensor is itself typically sandwiched between ferromagnetic first and second magnetic shield layers. These first and second shield layers also serve as first and second electrical lead layers, and are electrically connected to the tunnel junction sensor for conducting a tunneling current through it. The tunneling current can be configured to conduct Current Perpendicular to the Planes (CPP) of the film layers of the sensor, or alternately to conduct Current In the Planes (CIP) or parallel to film layers of the spin valve sensor. The CPP configuration is attracting more attention lately, as it can be made to be more sensitive than the CIP configuration, and thus is more useful in reading higher densities of tracks and data.

The magnetic moment of the free layer is free to rotate laterally within the layer with respect to the ABS from a quiescent or zero bias point position in response to positive and negative magnetic field signals from data bits located on the rotating magnetic disk. The sensitivity of the tunnel junction sensor is quantified as the magnetoresistive coefficient dr/R where dr is the change in resistance of the tunnel junction sensor from minimum resistance to maximum resistance and R is the resistance of the tunnel junction sensor at minimum resistance.

The free layer material is very soft material, magnetically speaking, with very low coercivity, which is a measure of the minimum field strength necessary to make changes in the orientation of the magnetic domains. The free layer material necessarily must have this quality, as it is this layer's changes in magnetic alignment in response to the magnetic data bits in the data disk that leads to changes in resistance, which is how the data is read.

As referred to above, it is common practice in the prior art to pin the pinned layer by using a layer of anti-ferromagnetic (AFM) material, but this method can have disadvantages that result from the thickness of the AFM material, which is typically relatively large. This thickness of AFM material may be so great that it is as thick as the other layers of sensor material combined, and has become one of the limiting factors in the reduction of size of the read heads. Therefore, there will be great advantages to read head sensors having a pinned layer or layers which do not depend on AFM material to pin the material, i.e. that are "self-pinned", such that the sensor can dispense with the AFM layer.

The magnetoresistive coefficient dr/R has also come to be referred to as the GMR%, as a shorthand measure of the sensitivity of the read head. The higher this percentage number is, the more sensitive the read head is. There is a constant desire to increase this GMR%, and thus the sensitivity of the read head.

Thus there is a need for a magnetic head having a read sensor with increased sensitivity.

SUMMARY OF THE INVENTION

A preferred embodiment of the present invention is a magnetic head having a read sensor for a CPP structure having improved GMR response. The read sensor includes a seed layer of NiFeCr, a self-pinned structure, a spacer layer, at least one free layer, and an upper capping layer. The self-pinned structure includes interleaved layers of ferromagnetic material and non-magnetic metal which are pinned through magnetostrictive anisotropy. The magnetic head also preferably includes a lower capping layer. An alternate embodiment of the CPP read sensor includes an in-stack biasing structure.

An advantage of the magnetic head of the present invention is that it includes a read head having an improved GMR % response, and thus higher sensitivity.

Another advantage of the magnetic head of the present invention is that it includes a read head that is without an AFM material layer, so that the overall thickness of the read sensor gap is reduced.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
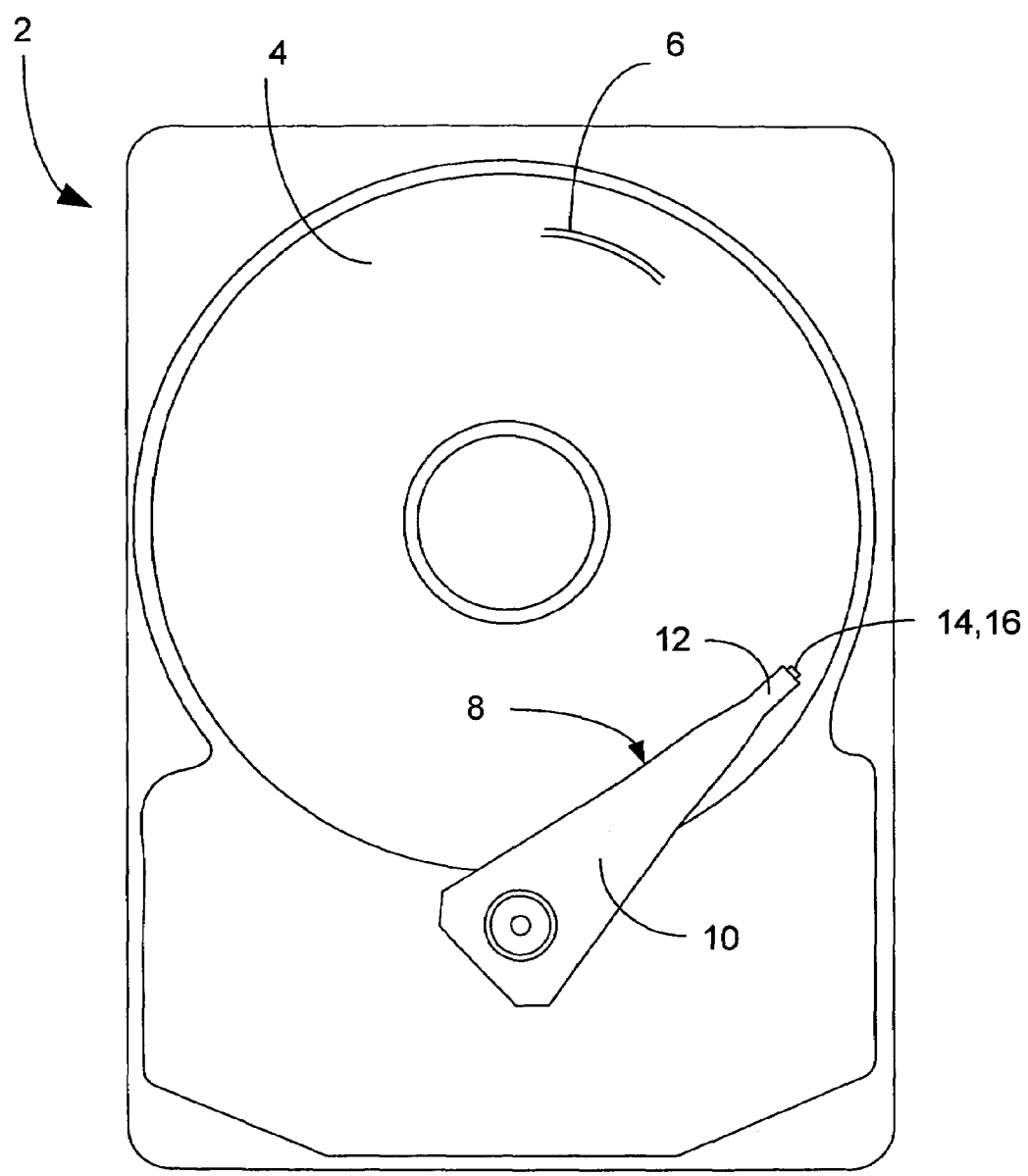
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
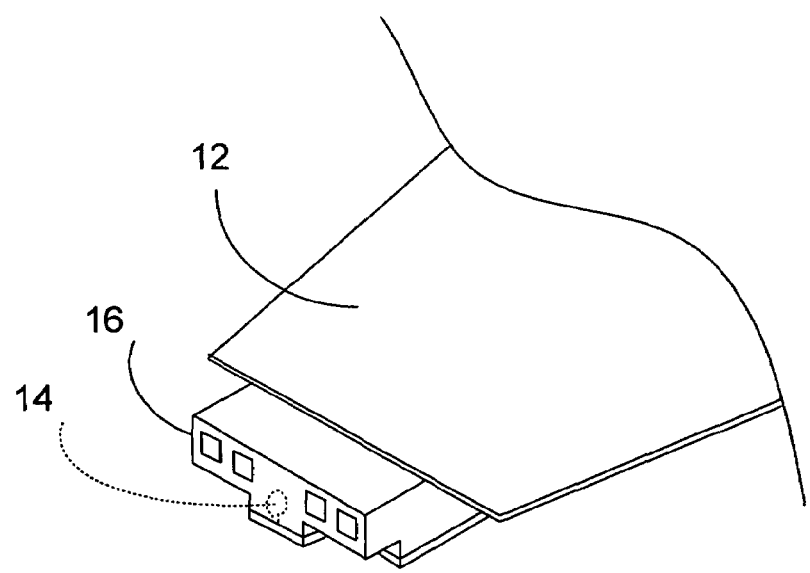
FIG. 2 illustrates a perspective view of view of an exemplary slider and suspension.
Figure 3:
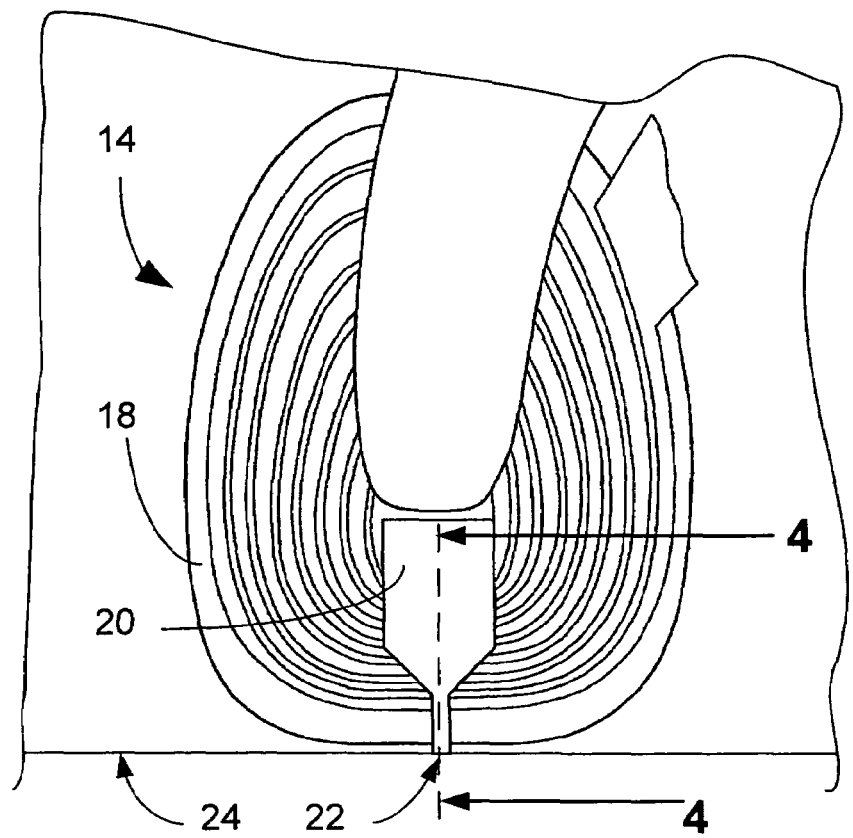
FIG. 3 shows a top plan view of an exemplary read/write head.
Figure 4:
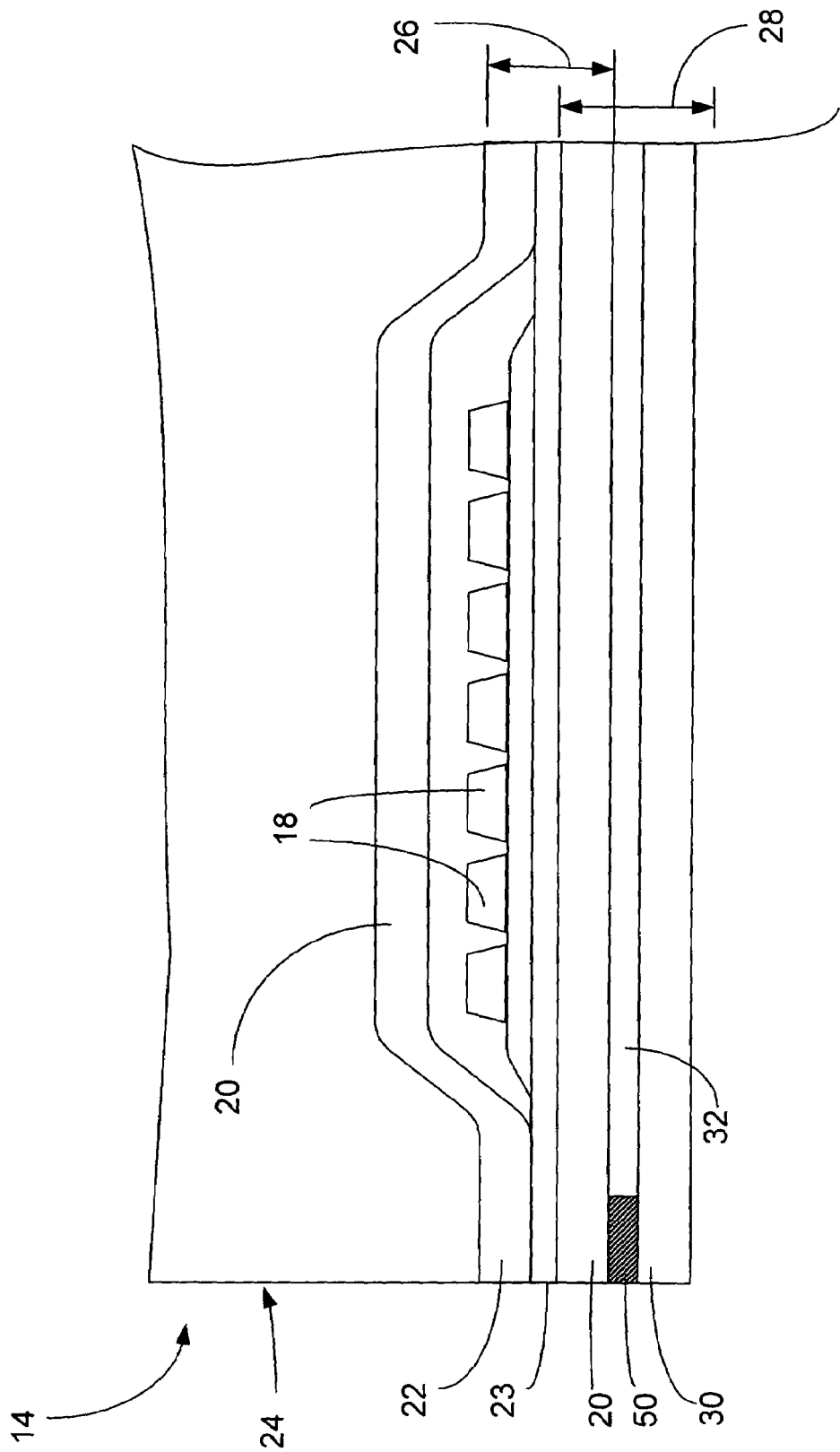
FIG. 4 is a cross-section view of an exemplary read/write head.

FIG. 2 shows a slider 16 in more detail being supported by suspension 12. The magnetic head 14 is shown in dashed lines, and in more detail in FIGS. 3 and 4. The magnetic head 14 includes a coil 18 and P1 pole, which also acts as S2 shield, thus making P1/S2 20. The second pole P2 22 is separated from P1/S2 by write gap 23. In a configuration of read head where Current is Perpendicular to the Plane (CPP), Shield S1 30 and P1/S2 20 act as electrodes supplying current to the read sensor 50 which lies between them. An insulation layer 32 also separates the S1 30 and P1/S2 20 electrodes in the area behind the read sensor 50, so that they do not short out along their length.

The magnetic head 14 flies on an air cushion between the surface of the disk 4 and the air bearing surface (ABS) 24 of the slider 16. The write head portion 26 and the read head portion 28 are generally shown, with the read head sensor 50 and the ABS 24. The present invention includes a CPP (Current Perpendicular to the Plane) read head sensor 50 which is constructed as shown in FIG. 6, which is a front plan view as seen from the Air Bearing Surface (ABS).

Figures 5, 6:
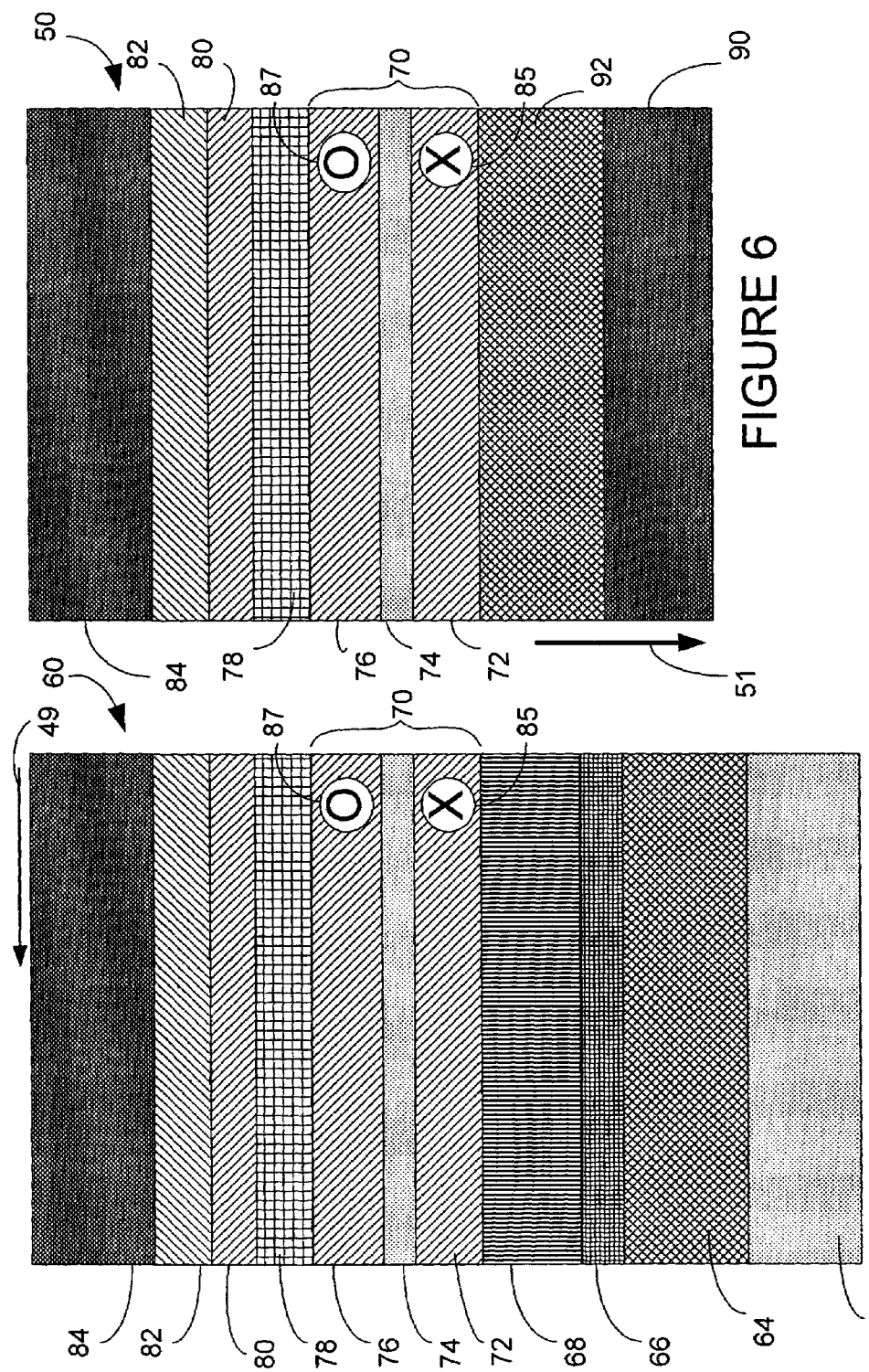
FIG. 5 is a front plan view of the structure of a CIP read sensor of the prior art as seen from the ABS.
FIG. 6 is a front plan view of the structure of a CPP read sensor of the present invention as seen from the ABS.

The present CPP read head 50 and its advantages may be understood by a comparison with a CIP (Current In the Plane) sensor 60 of the prior art, which is shown in FIG. 5. Where elements are similar, the same element numbers may be used.

A self-pinned CIP read sensor 60 is shown in FIG. 5. The current direction is indicated by the arrow 49 which runs parallel to the layers of material, thus establishing that the current runs in the plane (CIP) of the layers of material. In constructing this head, a layer of Al2O3 62 having a thickness of approximately 30 Å (30×10$^{-10}$ m) has been deposited, which acts as a spin valve seed layer and also to insulate the CIP read sensor 60 from the S1 shield layer 30 (see FIG. 4). This is followed by a layer of NiFeCr 64 having a thickness of approximately 30 Å, a layer of NiFe 66 having a thickness of approximately 8 Å, and a layer of PtMn 68 having a thickness of approximately 30 Å, which acts as a seed layer for constructing a self-pinned structure 70. The self-pinned structure 70 is preferably comprised of a first layer of ferromagnetic material 72, preferably CoFe having a thickness of approximately 14 Å, a layer of non-magnetic metal, preferably Ru 74 having a thickness of approximately 8 Å, and a second layer of ferromagnetic material 76, also preferably of CoFe, having a thickness of approximately 14 Å. A spacer layer 18, preferably of Cu having a thickness of approximately 19 Å is deposited upon the last of the interleaved layers of the self-pinned structure 70. First and second free layers 80, 82, are deposited on the spacer layer 78, where the first free layer 80, is preferably of CoFe having a thickness of approximately 10 Å and the second free layer 82, is preferably of NiFe having a thickness of approximately 15 Å. An upper capping layer 84, preferably comprised of Ta having a thickness of approximately 40 Å is deposited on top of the second free layer 82.

In contrast, FIG. 6 shows the CPP (Current Perpendicular to Plane) read sensor 50 20 of the present invention. The directional arrow 51 indicates the direction of current flow in the read sensor 50, which is perpendicular to the layers, thus establishing that the current runs perpendicular to the plane (CPP) of the material layers. In this configuration, it is necessary that current is not blocked by an insulation layer, such as the Al2O3 layer 62 seen in the CIP configuration of FIG. 5. Instead, a lower capping layer of Ta 90 having a thickness of approximately 30 Å is deposited, followed by a seed layer of NiFeCr 92 having a thickness of approximately 40 Å. The self-pinned structure 70, comprising sandwiched layers of a first layer of ferromagnetic material 72, preferably CoFe having a thickness of approximately 14 Å, a layer of non-magnetic metal, preferably Ru 74 having a thickness of approximately 8 Å, and a second layer of ferromagnetic material 76, also preferably CoFe having a thickness of approximately 14 Å. The self-pinned structure 70 uses compressive stress generated in the first ferromagnetic layer 72 by the non-magnetic layer 74 to align and pin the magnetic domains by magnetostrictive anisotropy, so that a layer of AFM material is not required. The first ferromagnetic layer 72 has magnetic field flux direction into paper, as indicated by the tail of the arrow 85, and the second ferromagnetic layer 76 has a magnetic field flux direction out of the paper, as indicated by the head of the arrow 87.

It has also been found that the overall resistance of the read head may be increased by oxidation of either or both of the ferromagnetic layers of the self-pinned structure. The oxidation may take place with exposure to oxygen in the processing chamber in the range of 10$^{-5}$ Torr to 10$^{-6}$ Torr.

Next, as with the CIP sensor 60, a spacer layer 78 of Cu having a thickness of approximately 19 Å is deposited upon the last of the interleaved layers of the self-pinned structure 70, with the first and second free layers 80, 82, deposited on the spacer layer 78. The first free layer 80, is preferably of CoFe having a thickness of approximately 10 Å and the second free layer 82, is preferably of NiFe having a thickness of approximately 15 Å. An upper capping layer 84, preferably comprised of Ta having a thickness of approximately 40 Å is deposited on top of the second free layer 82.

The interleaved layers of ferromagnetic material 72,76 and non-magnetic metal 74 produce an anisotropy effect, symbolized $H_k$, which refers to the tendency of the alignment of magnetization in material to point in certain directions in the absence of applied magnetic fields. Anisotropy $H_k$ can be produced in several ways, including the magnetocrystalline structure of the material, but can also be produced by combined stress and magnetostriction according to the formula $$H_k = 2K_u/M_s$$

where $M_s$ is the saturization magnetization, and $K_u$ is the anisotrophic constant found by $$K_u = 3/2 \times \lambda \times \tau$$

where λ is magnetostriction and τ is stress.

When the anisotropy $H_k$ increases to a certain level, the magnetic material is effectively "pinned" having the same effect as in the prior art where the pinned layer is fixed by the use of AFM material. As discussed above, self-pinned structure 70 can dispense with the need for AFM material, thus providing a much thinner structure which contributes to the further miniaturization of the overall read head.

A comparison of FIGS. 5 and 6 show some of the advantages of the present invention. Although no attempt has been made to draw the various layers strictly to scale, it can be seen that the overall thickness of the present CPP read sensor 50 is much reduced compared to the CIP read sensor 60.

The present invention also has significant advantages over other CPP structures. The change in resistance response of a magnetoresistive head to changes in data bits over which it passes allows the reading of data from the hard disk. The sensitivity of the CPP sensor of this type is quantified as magnetoresistive coefficient dr/R where dr is the change in resistance of the sensor from minimum resistance to maximum resistance and R is the resistance of the sensor at minimum resistance. As a shorthand, this is often noted as the percentage GMR response (GMR%). Naturally the larger this GMR% is, the more sensitive the sensor is, so there has been a drive to increase the GMR% in read heads. Here, in-plane GMR values will be used to evaluate the structures. A typical GMR% value for a CIP structure with an oxide seed layer has been in the range of 13-15%. The present inventor has found that for a CPP type structure similar to that of the present invention, but using Copper (Cu) as the seed layer in the position indicated as 92 in FIG. 6, the GMR% response was 10%, but by selecting the material of seed layer 92 to be Ta/NiFeCr, and without the PtMn AFM layer, the GMR% is boosted to 18%. Thus, Ta/NiFeCr is the preferred material for the seed layer 92 and forms an important aspect of the invention.

The self-pinned High GMR CPP structure allows us to use the AFM to provide an in-stack biasing scheme for improved head performance. This eliminates the need for commonly used contiguous junction type biasing.

Figure 7:
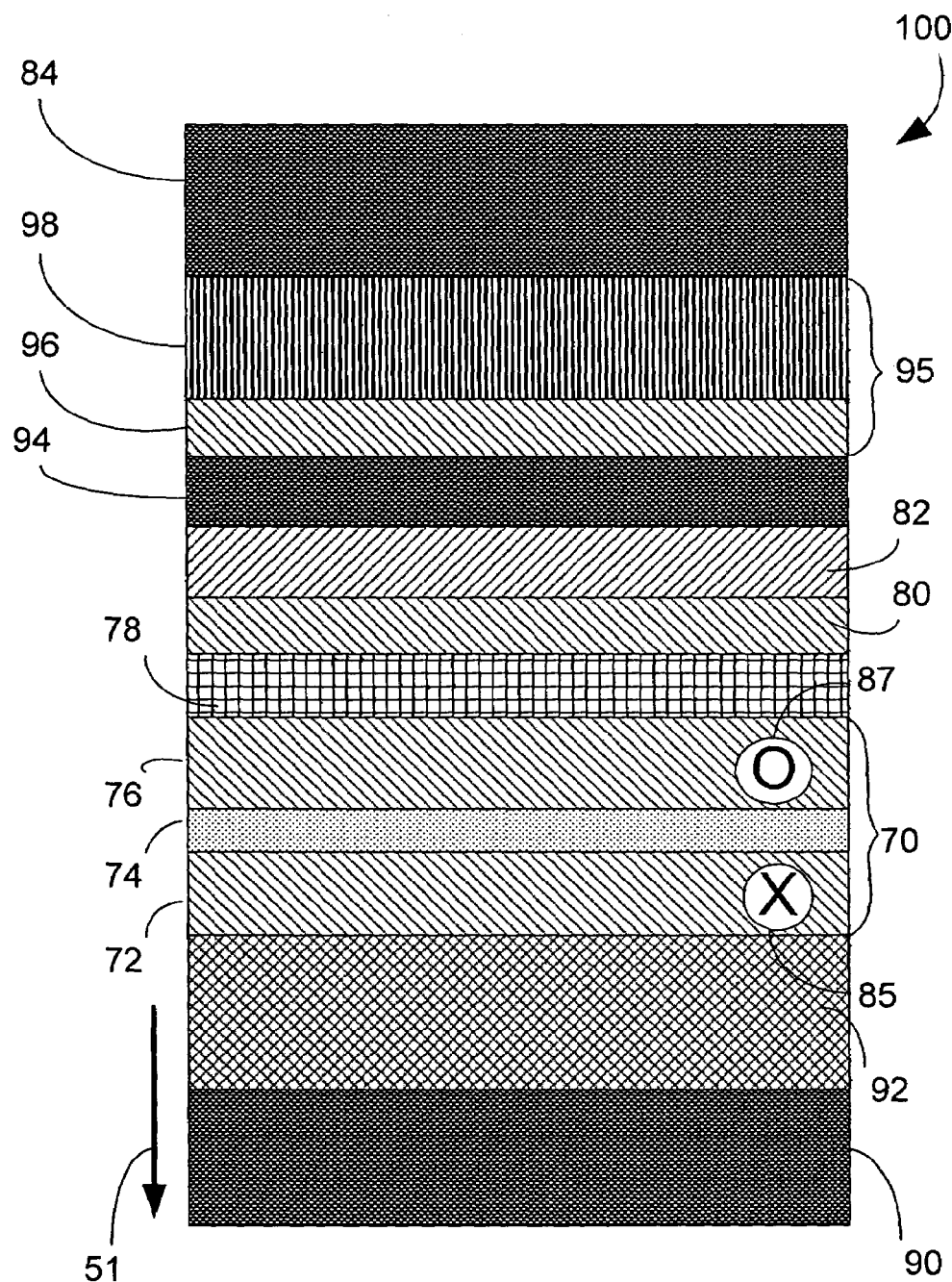
FIG. 7 is a front plan view of an alternate embodiment of the structure of a CPP read sensor of the present invention as seen from the ABS.

FIG. 7 shows an alternate embodiment of the read sensor having an in-stack biasing structure 100. The lower portion of the structure is the same as previously described with regard to FIG. 6, but on top of the second free layer 82, is a separation layer, preferably of Ta of a thickness of approximately 30 Å. Above this is the in-stack biasing structure 95, including a third layer of CoFe 96 of a layer thickness of approximately 20-40 Å and a layer of AFM material 98, preferably PtMn of a thickness of approximately 150 Å. It is important that the free layers be able to respond to changes of the magnetic data bits that it reads, but it is also important that the free layers not be allowed to assume a multi-domain state, when not actively responding to the data domains. The material of the free layers is magnetically soft and may therefore very easily fall into a multidomain state, where alignment of magnetic domains is not uniform. If the free layer material is allowed to assume a multidomain state, the read signal will be degraded. In order to maintain the alignment during the quiescent state to produce better signal quality, there must be some external bias applied to the free layer. This in-stack biasing structure 95 is used to bias the magnetic domains of the free layers 80, 82 in a preferred direction, and thus provides stability to the read sensor 100.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head comprising:
   a read sensor for CPP structure including:
   a seed layer consisting of NiFeCr;
   a self-pinned structure being fabricated directly upon said NiFeCr seed layer,
   wherein said self-pinned structure includes a plurality of self-pinned layers, said self-pinned layers including interleaved layers of ferromagnetic material and non-magnetic metal wherein at least one of said plurality of self-pinned layers is oxidized to increase the resistance of said magnetic head;
   a spacer layer being fabricated upon said self-pinned structure;
   at least one free layer being fabricated upon said spacer layer; and
   an upper capping layer being fabricated upon said at least one free layer.

2. The magnetic head of claim 1, wherein:
said plurality of self pinned layers includes a pair of CoFe layers separated by a layer of Ru.

3. The magnetic head of claim 1, wherein:
said at least one free layer comprises a first free layer and a second free layer.

4. The magnetic head of claim 3, wherein:
said first free layer is CoFe.

5. The magnetic head of claim 3, wherein:
said second free layer is NiFe.

6. The magnetic head of claim 1, further comprising:
a lower capping layer which lies beneath said seed layer.

7. The magnetic head of claim 6, wherein:
said lower capping layer is Ta.

8. The magnetic head of claim 1, further comprising:
a separation layer fabricated upon said at least one free layer; and
an in-stack biasing structure fabricated on said separation layer.

9. The magnetic head of claim 8, wherein:
said in-stack biasing structure includes a layer of CoFe and a layer of AFM material.

10. A disk drive comprising:
at least one hard disk;
at least one magnetic head adapted to fly over said hard disk for writing data on said hard disk, and having an air bearing surface, said magnetic head including:
a read sensor including:
   a seed layer consisting of NiFeCr;
   a self-pinned structure being fabricated directly upon said NiFeCr seed layer,
wherein said self-pinned structure includes a plurality of self-pinned layers, said self-pinned layers including interleaved layers of ferromagnetic material and non-magnetic metal wherein at least one of said plurality of self-pinned layers is oxidized to increase the resistance of said magnetic head;
   a spacer layer being fabricated upon said self-pinned structure;
   at least one free layer being fabricated upon said spacer layer; and
   an upper capping layer being fabricated upon said at least one free layer.

11. The disk drive of claim 10, wherein:
said plurality of self-pinned layers is a pair of CoFe layers separated by a layer of Ru.

12. The disk drive of claim 10, wherein:
said at least one free layer comprises a first free layer and a second free layer.

13. The disk drive of claim 12, wherein:
said first free layer is CoFe.

14. The disk drive of claim 12, wherein:
said second free layer is NiFe.

15. The disk drive of claim 10, further comprising:

a lower capping layer which is formed beneath said seed layer.

16. The disk drive of claim 15, wherein:

said lower capping layer is Ta.

17. The disk drive of claim 10, further comprising:

a separation layer fabricated upon said at least one free layer; and an in-stack biasing structure fabricated on said separation layer.

18. The disk drive of claim 17, wherein:

said in-stack biasing structure includes a layer of CoFe and a layer of AFM material.

19. A method of fabrication of a read head sensor of a magnetic head, comprising:

A) fabricating a seed layer consisting of NiFeCr;

B) fabricating a self-pinned structure directly upon said NiFeCr seed layer, wherein said self-pinned structure includes a plurality of self-pinned layers including interleaved layers of ferromagnetic material and non-magnetic metal, wherein at least one of said plurality of self-pinned layers is oxidized to increase the resistance of said magnetic head;

C) fabricating a spacer layer upon said self-pinned structure;

D) fabricating at least one free layer upon said spacer layer.

20. The method of fabrication of a read head sensor of claim 19, wherein:

said plurality of self-pinned layers includes a pair of CoFe layers separated by a layer of Ru.

21. The method of fabrication of a read head sensor of claim 19, further comprising:

E) fabricating an upper capping layer on said at least one free layer.

22. The method of fabrication of a read head sensor of claim 19, wherein:

A) includes fabricating a lower capping layer beneath said seed layer.

23. The method of fabrication of a read head sensor of claim 22, wherein:

said lower capping layer is Ta.

24. The method of fabrication of a read head sensor of claim 19, wherein:

said at least one free layer comprises a first free layer and a second free layer.

25. The method of fabrication of a read head sensor of claim 24, wherein:

said first free layer is CoFe.

26. The method of fabrication of a read head sensor of claim 24, wherein:

said second free layer is NiFe.

27. The method of fabrication of a read head sensor of claim 19, wherein:

C) includes fabricating a separation layer upon said at least one free layer and fabricating an in-stack biasing structure on said separation layer.

* * * * *